United States Patent [19]
Zuech

[11] 3,869,470
[45] Mar. 4, 1975

[54] DEHYDROGENATION OF PYRROLIDINES

[75] Inventor: Ernest A. Zuech, Bartlesville, Okla.

[73] Assignee: Phillips Petroleum Company, Bartlesville, Okla.

[22] Filed: July 31, 1973

[21] Appl. No.: 384,378

[52] U.S. Cl. .............................................. 260/313.1
[51] Int. Cl. ............................................ C07d 27/00
[58] Field of Search ................................. 260/313.1

[56] References Cited
OTHER PUBLICATIONS
Chemical Abstracts, Vol. 73, (1970) Pars 14,701(y).

JACS 73, (1951) pages 5230–5234.

JACS 77 (1955) pages 4100–4104.

*Primary Examiner*—Elbert L. Roberts

[57] ABSTRACT

Pyrrolidines are dehydrogenated using a rhodium catalyst, preferably on a suitable support. Pyrrolines are produced. Trans-2,5-dimethylpyrrolidine can be converted to cis-2,5-dimethylpyrrolidine. High selectivities are demonstrated with use of a rhodium catalyst.

8 Claims, No Drawings

DEHYDROGENATION OF PYRROLIDINES

This invention relates to the dehydrogenation of pyrrolidines. It also relates to the conversion of high trans-isomer content of 2,5-dimethyl-pyrrolidine to 2,5-dimethylpyrrole and/or to 2,5-dimethyl-Δ'-pyrroline. Further, the invention relates to the use of a rhodium promoted catalyst support for the dehydrogenation of nitrogen containing cyclic compounds, e.g., pyrrolidines.

In one of its concepts, the invention provides a process for the dehydrogenation of pyrrolidines to pyrrolines employing a catalyst consisting essentially of rhodium. In another of its concepts, the catalyst is supported on a suitable catalyst support, e.g., silica, gamma-alumina, silica-alumina, carbon, etc. In a further concept of the invention depending upon the temperature employed and other related conditions, 2,5-dimethyl-pyrrolidine containing trans-isomer is dehydrogenated or converted to 2,5-dimethylpyrrole and/or 2,5-dimethyl-Δ'-pyrroline. A further concept still of the invention provides catalyst and conditions for best converting pyrrolidines.

An object of the invention is to dehydrogenate a pyrrolidine. Another object of the invention is to convert trans-2,5-dimethyl-pyrrolidine to the cis-form. A further object of the invention is to dehydrogenate 2,5-dimethyl-pyrrolidine having an undesirably high trans-isomer content to either 2,5-dimethylpyrrole and/or 2,5-dimethyl-Δ'-pyrroline. A further object still is to provide the latter compounds suitable for use in their selective hydrogenation to cis-2,5-dimethylpyrrolidine useful in production of herbicides.

Other aspects, concepts, objects and the several advantages of the invention are apparent from a study of this disclosure and the appended claims.

According to the present invention, a pyrrolidine is dehydrogenated under dehydrogenating conditions employing a rhodium catalyst. Further according to the invention, the rhodium is distributed or incorporated into a suitable support.

Pyrrolidines suitable for dehydrogenation to pyrrolines according to the instant invention can be represented by the following general formula:

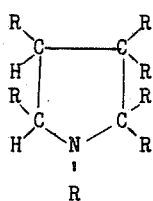

wherein R is hydrogen or an alkyl radical having from 1-4 carbon atoms.

Of the above general formula, only one molecule of hydrogen may be removed in the dehydrogenation reaction of the invention. For example, a 2,2,3,3-tetraalkyl-substituted pyrrolidine would be expected to give only the corresponding Δ4-pyrroline as the dehydrogenation product because the catalyst and the usual conditions of operation of the invention are not conducive to dealkylation and one would hardly expect the formation of an alkyne linkage. Examples of suitable pyrrolidines which can be employed in the process of the instant invention include pyrrolidine, 2,5-dimethylpyrrolidine, 3,4-diethylpyrrolidine, 2,3,4,5-tetramethylpyrrolidine, 1,3-dipropylpyrrolidine, 1,2,3-tributylpyrrolidine, 1,2,3,4,5-pentamethylpyrrolidine, 2,2,3,3-tetramethylpyrrolidine, 2,2,4-triethylpyrrolidine and the like.

Catalysts suitable for use in the instant invention contain catalytic rhodium. It is convenient to employ the rhodium on a support material as is commonly done in the heterogenous catalyst art. suitable supports preferably are those which are neither strongly acidic nor strongly basic but are essentially neutral e.g., silica, gamma-alumina, silica-alumina, carbon and the like. The catalysts usually will contain from about 0.01 to about 20 percent by weight rhodium based on the total catalyst composite, preferably from about 0.1 to about 5 percent by weight rhodium.

The dehydrogenation of suitable pyrrolidines according to the instant invention is carried out at a liquid hourly space velocity (volumes of liquid reactant per volume of catalyst per hour) (LHSV) of from about 0.05 to about 50, preferably from about 0.1 to about 5.

The temperature broadly will be in the range of from about 200° to about 450°C while the preferred range is from about 250° to about 400°C.

The dehydrogenation preferably is effected in the presence of added hydrogen. The amount of added hydrogen is in the range of from about 0.5 to about 50, preferably from about 1 to about 15 liters of hydrogen per liter of catalyst per minute.

The pressure employed in the dehydrogenation reaction of this invention can vary from about 0.01 atmosphere up to about 20 atmospheres, preferably from about 0.5 to about 5 atmospheres.

The dehydrogenated products produced by the instant invention can be conveniently recovered from the reaction mixture by fractional distillation.

The pyrrolines produced with high selectivity according to this invention can be converted by hydrogenation known in the art to pyrrolidines and in the case of the 2,5-dimethyl-Δ'-pyrroline to cis-2,5-dimethylpyrrolidine. This compound has utility for the preparation of herbicidal compounds as described in West German Pat. application No. 2,033,908 laid open Jan. 13, 1972. Thus the invention provides a route to transform trans-2,5-dimethylpyrrolidine to the desired cis-2,5-dimethylpyrrolidine.

The following examples are given to illustrate the invention and to show it has several advantages.

EXAMPLE I

Several runs were made to dehydrogenate a mixture of cis- and trans-2,5-dimethylpyrrolidine with a catalyst of the prior art, palladium on silica of 1.4 percent by weight palladium. The runs were carried out in a tubular reactor charged with 35ml of the above catalyst and equipped with an electrical heater. The catalyst was prereduced under flowing hydrogen at 430°C. The reactions were conducted at atmospheric pressure and at a hydrogen flow rate 8.57 liters per liter of catalyst per minute. The feed space velocity was 0.57. The results of these runs are shown in Table I below. Compound A is 2,5-dimethylpyrrolidine, B is 2,5-dimethyl-Δ'pyrroline and C is 2,5-dimethylpyrrole.

Table I

| Run No. | Temp. °C | Wt.% of Products [a] | | | | |
|---|---|---|---|---|---|---|
| | | Compd A | Compd B | Unknowns before C | Compd C | Unknowns after C |
| 1 | 430 | —[b] | —[b] | 10.0 | 67.4 | 21.0 |
| 2 | 400 | 0.3 | 1.6 | 3.0 | 87.7 | 5.9 |
| 3 | 375 | 0.3 | 5.5 | 1.7 | 89.0 | 2.0 |

[a] Analysis was by gas-liquid phase chromatography.
[b] None detected.

With a palladium catalyst under the conditions employed only a relatively small amount of the 2,5-dimethyl-Δ'-pyrroline is formed and the predominant product is the fully dehydrogenated 2,5-dimethylpyrrole.

EXAMPLE II

Rhodium on silica (1.4 percent by weight rhodium), was employed for the dehydrogenation of a mixture of cis- and trans-2,5-dimethylpyrrolidine. The catalyst was prepared as for Example I. The same reactor, catalyst volume, hydrogen flow rates and feed flow rates that were employed in the runs of Example I were also used in these runs. The results are shown in Table II below.

Table II

| Run No. | Temp. °C | Wt.% of Products [a] | | | | |
|---|---|---|---|---|---|---|
| | | Compd A | Compd B | Un- knowns before C | Compd C | Unknowns after C |
| 4 | 400 | 11.1 | 45.0 | 0.9 | 41.0 | 0.5 |
| 5 | 450 | 4.6 | 49.7 | 2.2 | 38.3 | 4.3 |
| 6 | 320 | 63.4 | 33.0 | —[b] | 0.7 | —[b] |

[a] [b] See Footnotes to Table I.

The results in Table II demonstrate the operability of a rhodium catalyst for the dehydrogenation of 2,5-dimethylpyrrolidine to 2,5-dimethyl-Δ'-pyrroline. In particular, the high selectivity of the dehydrogenation to produce the pyrroline for rhodium catalyst is shown in Run 6, in which the proportion of low and high unknowns, and C, i.e., 0.7, is noted. This result shows that unreacted 2,5-dimethylpyrrolidine can be recycled to the dehydrogenation reactor and that 2,5-dimethyl-Δ'-pyrroline can be selectively hydrogenated to cis-2,5-dimethylpyrrolidine.

It is known in the art to convert the pyrroline to the pyrrolidine with a platinum catalyst.

Reasonable variation and modification are possible within the scope of the foregoing disclosure and the appended claims to the invention the essence of which is that a rhodium catalyst, suitably on a suitable support has been found to be most effective for the dehydrogenation of pyrrolidines, e.g., 2,5-dimethylpyrrolidine to, say, 2,5-dimethyl-Δ'-pyrroline and for other conversions as herein set forth and described.

I claim:

1. The dehydrogenation of pyrrolidines to pyrrolines which comprises subjecting pyrrolidines represented by the general formula:

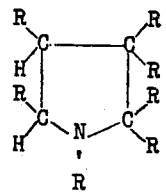

wherein R is hydrogen or an alkyl radical having from 1–4 carbon atoms, under conditions of dehydrogenation and to the action of a rhodium-containing catalyst to produce said pyrrolines.

2. A process according to claim 1 wherein the catalyst consists essentially of rhodium and a support.

3. A process according to claim 2 wherein the support is selected from at least one of the following: silica, gamma-alumina, silica-alumina, and carbon.

4. A process according to claim 2 wherein the catalyst contains from about 0.01 to about 20 percent by weight of rhodium based on the total catalyst composite.

5. A process according to claim 1 wherein the pyrrolidine is dehydrogenated under the following conditions: a liquid hourly space velocity of from about 0.05 to about 50 volumes of liquid reactant per volume of catalyst per hour, a temperature in the range of from about 200° to about 450°C and in the presence of added hydrogen in the range of from about 0.5 to about 50 liters of hydrogen per liter of catalyst per minute, and the pressure is from about atmospheric to about 20 atmospheres.

6. A process according to claim 1 wherein 2,5-dimethylpyrrolidine is dehydrogenated to 2,5-dimethyl-Δ'-pyrroline in the presence of a rhodium-silica catalyst.

7. A process according to claim 1 wherein a mixture of at least cis- and trans-2,5-dimethylpyrrolidine are dehydrogenated in the presence of the catalyst.

8. A process according to claim 7 wherein the temperature during the dehydrogenation is of the order of about 300°C.

* * * * *